United States Patent
Kopko

(10) Patent No.: US 7,168,235 B2
(45) Date of Patent: Jan. 30, 2007

(54) HIGHLY SUPERCHARGED REGENERATIVE GAS TURBINE

(75) Inventor: William L. Kopko, Springfield, VA (US)

(73) Assignee: Mechanology, Inc., Attleboro, MA (US)

( * ) Notice: Subject to any disclaimer, the term of this patent is extended or adjusted under 35 U.S.C. 154(b) by 0 days.

(21) Appl. No.: 11/099,218

(22) Filed: Apr. 5, 2005

(65) Prior Publication Data
US 2006/0005527 A1    Jan. 12, 2006

Related U.S. Application Data

(60) Provisional application No. 60/559,010, filed on Apr. 5, 2004.

(51) Int. Cl.
*F02C 3/055* (2006.01)
*F02C 7/10* (2006.01)

(52) U.S. Cl. ............ 60/39.45; 60/39.511; 60/729

(58) Field of Classification Search ......... 60/39.45, 60/39.511, 729, 791, 792
See application file for complete search history.

(56) References Cited

U.S. PATENT DOCUMENTS

| | | | | |
|---|---|---|---|---|
| 2,418,911 | A | * | 4/1947 | Smith .............. 60/39.17 |
| 2,646,663 | A | * | 7/1953 | Sedille ............ 60/39.511 |
| 2,674,982 | A | | 4/1954 | McCall |
| 3,060,910 | A | | 10/1962 | McCall |
| 3,765,170 | A | * | 10/1973 | Nakamura ........ 60/39.511 |
| 3,841,276 | A | | 10/1974 | Case |
| 4,005,682 | A | | 2/1977 | McCall et al. |
| 4,341,070 | A | | 7/1982 | Clarke |
| 5,233,954 | A | | 8/1993 | Chomyszak |
| 6,729,295 | B2 | | 5/2004 | Tomczyk |
| 6,854,272 | B2 | | 2/2005 | Finger et al. |

(Continued)

FOREIGN PATENT DOCUMENTS

DE     886 542     7/1953

(Continued)

OTHER PUBLICATIONS

U.S. Appl. No. 10/744,230, filed Dec. 22, 2003, Bailey et al.

(Continued)

*Primary Examiner*—L. J. Casaregola
(74) *Attorney, Agent, or Firm*—Elmore Patent Law Group; Carolyn S. Elmore; Darlene A. Vanstone

(57) ABSTRACT

The present invention comprises a highly supercharged, regenerative gas-turbine system. The gas turbine comprises a compressor, a regenerator, a combustor, and an expander. A pre-compressor pressurizes air going into the compressor section of the gas turbine. A cooler lowers the temperature of the air going into the compressor. The compressor pressurizes air, which then flows through the regenerator, which heats the air before it enters the combustor. The combustor further heats the air which then flows through the expander and then the regenerator. A post-expander is preferably located downstream of the regenerator. The post-expander is a second expander that receives high-pressure gas exiting the regenerator. The post-expander preferably drives the pre-compressor. The preferred pre-compressor and post-expander are toroidal intersecting vane machines (TIVMs), which are positive-displacement rotary devices. Numerous alternated embodiments of this basic system are described.

6 Claims, 2 Drawing Sheets

U.S. PATENT DOCUMENTS

| | | |
|---|---|---|
| 6,901,904 B1 | 6/2005 | Martin et al. |
| 6,938,404 B2 * | 9/2005 | Awdalla .................... 60/39.27 |
| 2003/0182944 A1 | 10/2003 | Hoffman et al. |
| 2005/0198957 A1 | 9/2005 | Kim |

FOREIGN PATENT DOCUMENTS

| | | |
|---|---|---|
| DE | 4127870 A1 | 1/1992 |
| FR | 1 200 933 | 12/1959 |
| GB | 282038 | 10/1928 |

OTHER PUBLICATIONS

U.S. Appl. No. 10/744,232, filed Dec. 22, 2003, Ingersoll.

* cited by examiner

HIGHLY SUPERCHARGED REGENERATIVE GAS TURBINE

RELATED APPLICATION

This application claims the benefit of U.S. Provisional Application No. 60/559,010, filed on Apr. 5, 2004. The entire teaching of the above application is incorporated herein by reference.

BACKGROUND

Gas turbines have long used regenerators to improve efficiency. In the broadest terms, regenerators are heat exchangers that preheat air exiting the compressor section using thermal energy from exhaust exiting the expander section of the gas turbine. These include rotary, direct-contact regenerators and recuperators that use a heat-transfer surface as a wall between the air and the combustion gasses.

Supercharging of gas turbines has a long history. Foster-Pegg describes some early systems from the 1960's. (See Foster-Pegg R. W., "Supercharging of Gas Turbines by Forced Draft Fans with Evaporative Intercooling," *American Society of Mechanical Engineers*, Jan. 7, 1965, pp. 1–12.) Recent advances include variable-pressure supercharging such as described in U.S. Pat. No. 6,308,512.

Conventional wisdom is that compressors and expanders used for gas turbines should be of kinetic design. Standard textbooks, such as *Fundamental of Gas Turbines* by William Blathie and *The Design of High-Efficiency Turbomachinery and Gas Turbines* by David Gordon Wilson, concentrate almost exclusively on axial-flow and radial-flow machines for compressors and expanders.

In addition, conventional wisdom is that the regenerator should be downstream of the expander and that the optimum combustor efficiency occurs at a low pressure ratio (i.e. combustor pressure to atmospheric pressure). High pressure ratios are generally found to produce worse mechanical efficiency for regenerative systems, which generally use pressure ratios of about 4 or less.

Copending application (Hoffman and Kopko, 20030182944) describes a highly supercharged gas turbine system. The present invention is an improvement of this system with special emphasis on the application of high-pressure supercharging to regenerative gas turbines such as found in microturbines and other small systems.

SUMMARY OF THE INVENTION

The present invention comprises a highly supercharged, regenerative gas-turbine system. The gas turbine comprises a compressor, a regenerator, a combustor, and an expander. A pre-compressor pressurizes air going into the compressor section of the gas turbine. A cooler lowers the temperature of the air going into the compressor. The compressor pressurizes air, which then flows through the regenerator, which heats the air before it enters the combustor. The combustor further heats the air which then flows through the expander and then the regenerator. A post-expander is preferably located downstream of the regenerator. The post-expander is a second expander that receives high-pressure gas exiting the regenerator. The post-expander preferably drives the pre-compressor. The preferred pre-compressor and post-expander are toroidal intersecting vane machines (TIVMs), which are positive-displacement rotary devices. Numerous embodiments of this basic system are described.

DESCRIPTION OF THE PREFERRED EMBODIMENT

Figure 1:
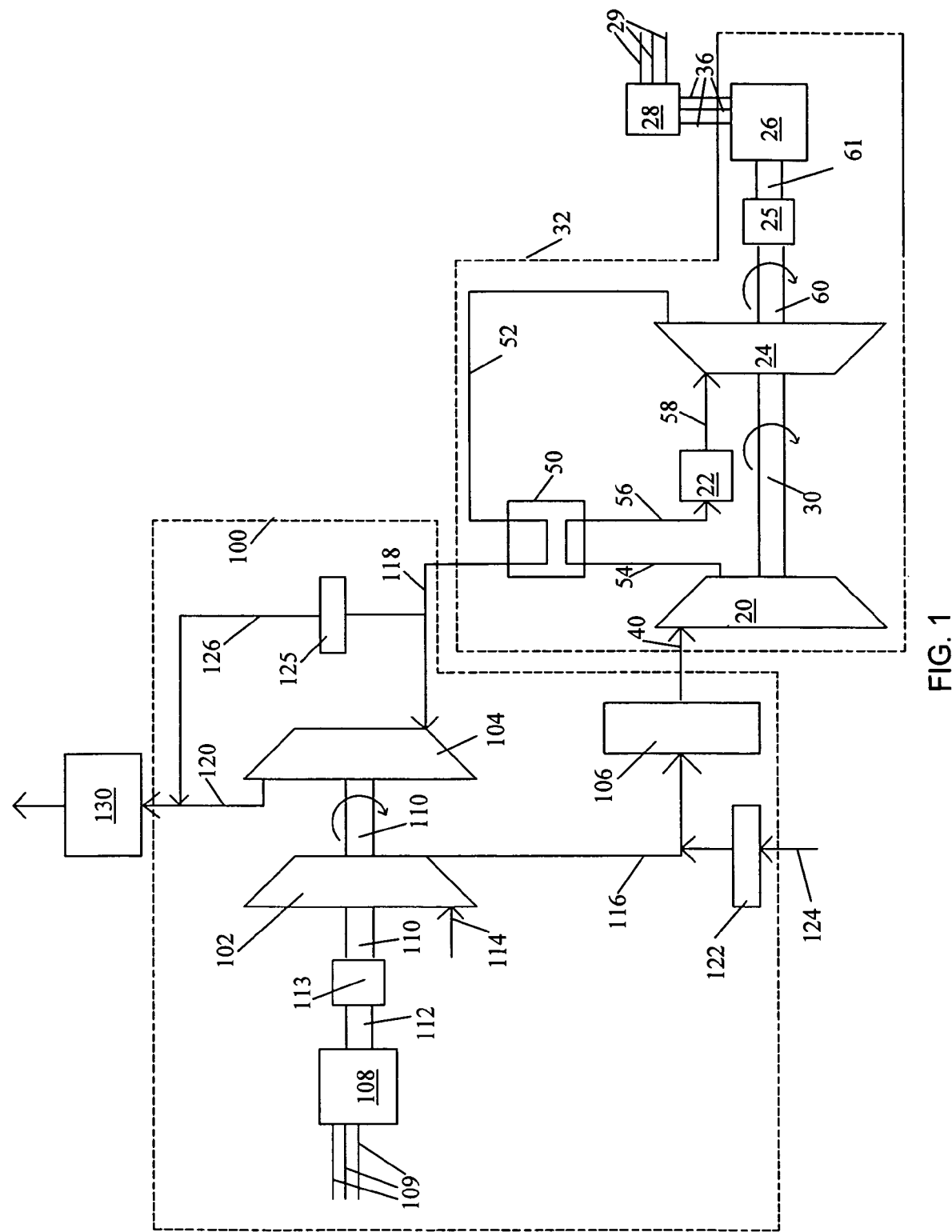
FIG. 1 shows a preferred embodiment of the invention.

A gas turbine 32 receives a compressor inlet air stream 40 from a supercharger 100. The gas turbine 32 comprises a compressor 20, a regenerator 50, a combustor 22, and an expander 24. The expander drives said compressor via a shaft 30. The expander also drives an output shaft 60, which preferably drives a generator 26 via a speed reducer 25 and a motor shaft 61. The generator produces electrical power that is conducted through conductors 36 to a switch gear 28 and then output to a power line 29. Alternatively the output shaft 60 may drive a compressor, pump, or other equipment.

Air moves through the gas turbine 32 to produce useful power. The compressor 20 receives a pressurized air stream 40, compresses it to form a compressed air stream 54, which then enters the regenerator 50. The regenerator heats the air to form a heated air stream 56 which then enters the combustor 22. The combustor burns a fuel such as natural gas or oil to produce a hot gas stream 58 that flows into an expander 24. The expander 24 lowers the pressure of the gas stream and extracts useful work from the process. A gas stream 52 exits the expander and flows through the regenerator 50. The regenerator 50 cools the gas stream which exits as a hot gas stream 118.

The regenerator is preferably a rotary, direct-contact heat exchanger. Wilson (RE37,134) describes a preferred heat regenerator. Alternatively the regenerator may be a recuperator, which uses a heat transfer surface that acts as a wall to separate the air stream from the gas stream.

While the gas turbine 32 is similar to unsupercharged gas turbines, there are several important differences. First the shafts 30 and 60 may need to be strengthened to handle the higher torque. Second, the housing may also require strengthening for the higher working pressure. Third, the generator capacity should be increased. Fourth, the fuel capacity requirement of the combustor is larger.

While these changes are significant, the basic aerodynamic design of the gas turbine should remain very close to that of the base, unsupercharged machine. Likewise, the stresses on the rotating parts are normally dominated by the centrifugal forces associated with high-speed rotation, which means that the increased density of the gas usually does not significantly change the strength requirements of these parts.

The supercharger 100 comprises a first pre-compressor 102, a first cooler 106, and a first post-expander 104. A first electromechanical transducer 108 is connected through shafts 112 and 110 and a first speed reducer 113 to the first pre-compressor 102 and the first post-expander 104. The first electromechanical transducer 108 preferably comprises an induction motor that can also act as a generator and is electrically connected to power line 109. The speed reducer is normally required because the optimum compressor and expander speed is generally a few hundred rpm for positive displacement devices, while the electromechanical transducer would normally operate at a higher speed. The speed reducer may be eliminated in cases for very small systems or for systems where the synchronous speed of the transducer is low enough to match that of the pre-compressor and post-expander. For kinetic devices such as a centrifugal or axial compressor or expander, a speed increaser may be necessary in place of the speed reducer since the optimum speed for kinetic devices is generally above 3600 rpm.

During supercharging operation an air stream 114 enters the first pre-compressor 102, which pressurizes the air to form a first pressurized air stream 116. Air stream 114 is typically ambient air at near atmospheric pressure, unless a second stage of supercharging is included as will be described in FIG. 2. The first cooler 106 receives the pressurized air stream and lowers the temperature of the air stream to form the compressor inlet air stream 40, which enters the compressor 20 in the gas turbine 32. A hot gas stream 118 exits the gas turbine 32 and flow through the first post-expander 104. A gas stream 120 exist the first post-expander 104 and enters an optional heat-recovery heat exchanger 130. The heat-recovery heat exchanger would preferably heat water or other fluid for space heating, domestic water heating, industrial processes, etc.

The system includes bypass features for conditions where supercharging is not required. A bypass damper 122 allows an air stream 124 to flow into the cooler 106 without going through the first pre-compressor 114. Similarly a bypass damper 125 allows a gas stream 126 to flow around the first post-expander 104. The result is that operation is possible without supercharging. Operation without supercharging may be desirable at startup or when less than full capacity is required.

The preferred pressure ratio across the gas turbine (inlet over exit) is between about 0.9 and 1.4. The preferred pressure ratio across the pre-compressor is between about 1.2 and about 8 or even higher with a more preferred range of about 2 to 4. For systems where variable output is required, the pre-compressor and post-expander should include a capacity control to modulated flow and optimize performance a variable pressure ratios. These controls may include variable speed drives and internal controls for the pre-compressor and post-expander.

For smaller gas turbine such as those with an unsupercharged capacity below about 1 MW, the preferred pre-compressor and post-expander are rotary, positive-displacement devices. The preferred device of this within this class of machines is a toroidal intersecting vane machine (TIVM). The TIVM technology is owned by Mechanology LLC and is described in U.S. Pat. No. 5,233,954 by Stephen Chomyszak, and U.S. Ser. No. 10/744,230, which are incorporated by reference. The TIVM can achieve high efficiency in a very compact design. Other alternatives include scroll and screw compressors and expanders.

The TIVM machine also offers the opportunity to combine the pre-compressor and post-expander into one housing. This option can give a more-compact design, but it is not generally preferred because of undesirable heat transfer between the air in the pre-compressor and the gas flowing through the post-expander.

One limitation of the TIVM expander is that it uses flexible seals. Locating the post-expander downstream of the regenerator limits working temperatures, which allows the use of conventional seal materials such as plastics.

Alternatively kinetic machines may be used for the pre-compressor and post-expander. Kinetic machines include centrifugal and axial flow compressors and expanders. An axial flow expander and a centrifugal compressor may be used instead of the TIVM, if they give an efficiency advantage. If the regenerator is eliminated or other design changes result high temperatures leaving the gas turbine, then a kinetic expander may be preferred because it ability to work at high temperatures without seal materials.

Preferred Embodiment with Multiple Stages of Supercharging

Figure 2:
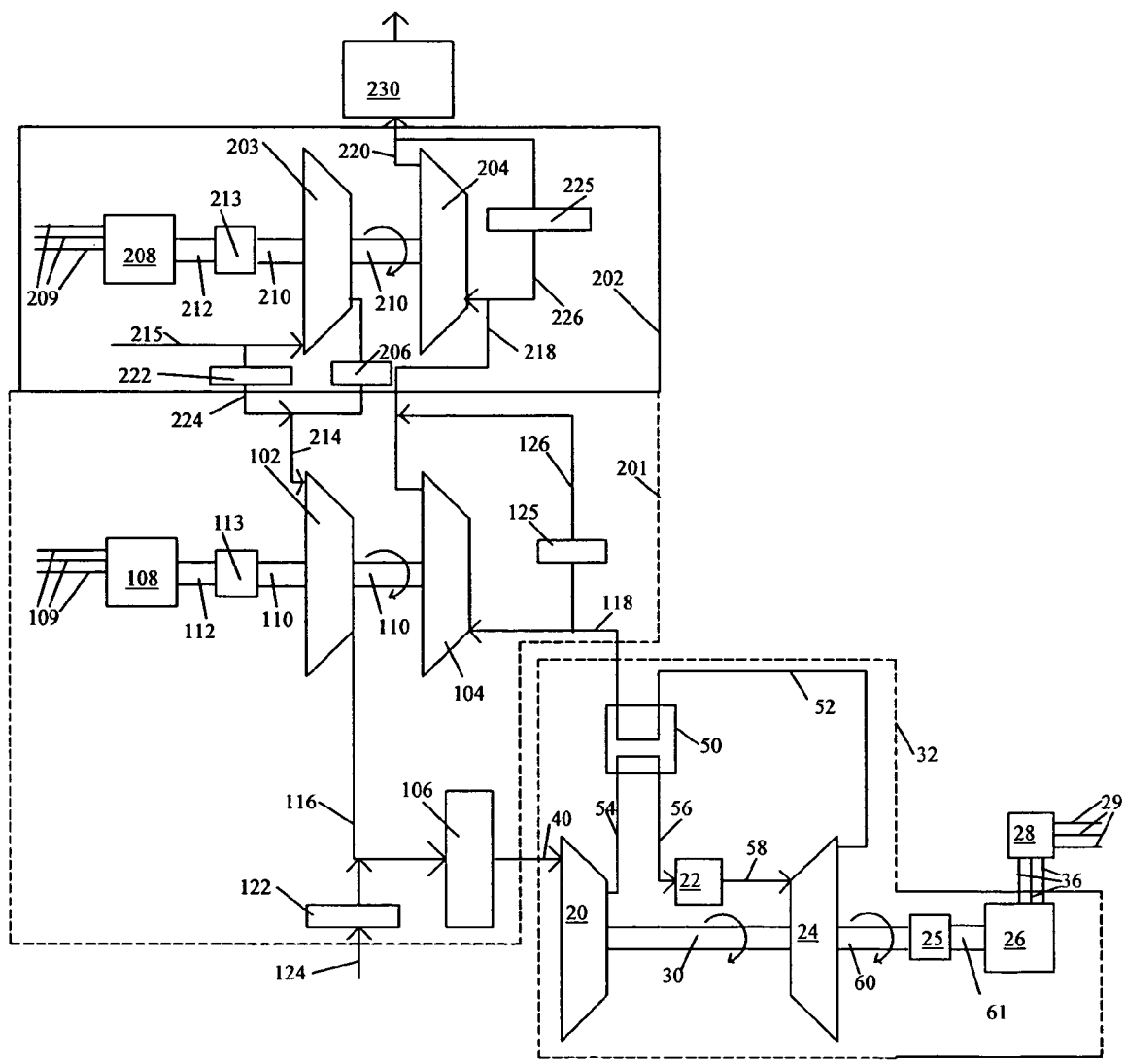
FIG. 2 shows a preferred multistage embodiment of the invention.

FIG. 2 shows a preferred embodiment that includes two stages of supercharging. A first stage of supercharging 201 is essentially identical to the supercharger of FIG. 1. A second stage of supercharging 202 is located in series with the first stage of supercharging 201. Each stage can be turned on and off, and each stage can be bypassed.

Operation of the two stages of supercharging can be sequenced to provide multiple stages of capacity. For example, if each stage has a pressure ratio of about 2, then the pre-compressor in the second stage of supercharging would be sized to handle about twice the volumetric flow as that for the first stage. If the unsupercharged capacity of the gas turbine were 250 kW, operation with the first stage of supercharging would give an output of about 500 kW. Operation with both the first stage and the second stage of supercharging would give a supercharging pressure ratio of about 4 and about 1000 kW of plant capacity. Normally the second stage would only operate when the first stage is already running.

The construction of the second stage of supercharging is similar to that of the first stage as was described in FIG. 1. The second stage supercharger 202 comprises a second pre-compressor 203, a second cooler 206, and a second post-expander 204. A second electromechanical transducer 208 is connected through shafts 212 and 210 and a second speed reducer 213 to the second pre-compressor 203 and the second post-expander 204. The second electromechanical transducer 208 preferably comprises an induction motor that can also act as a generator and is electrically connected to power line 209. The speed reducer is normally required because the optimum compressor and expander speed is generally a few hundred rpm for positive displacement devices, while the electromechanical transducer would normally operate at a higher speed.

During supercharging operation an air stream 215 enters the second pre-compressor 203, which pressurizes the air to form a pressurized air stream 216. Air stream 215 is preferably ambient air at near atmospheric pressure. The second cooler 206 receives the pressurized air stream and lowers the temperature of the air stream to form a pressurized air stream 214 that goes into the first pre-compressor 102 of the first stage of supercharging 201. A hot gas stream 218 exits the first post expander 104 of the first stage of supercharging 201 and flows through the second post-expander 204. A gas stream 220 exist the second post-expander 204 and enters an optional heat-recovery heat exchanger 230. The heat-recovery heat exchanger would preferably heat water or other fluid for space heating, domestic water heating, industrial processes, etc.

The system includes bypass features for conditions when the second stage of supercharging is not required. A bypass damper 222 allows an air stream 224 to flow around the second pre-compressor 203. Similarly a bypass damper 225 allows a gas stream 226 to flow around the second post-expander 204. The result is that operation is possible without the second stage of supercharging. Operation without the second stage of supercharging may be desirable at startup or when less than full capacity is required.

While FIG. 2 shows a system with two stages of supercharging, the same basic configuration can be extended to any number of stages of supercharging.

Other Alternative Embodiments

There are many alternative embodiments that incorporate the basic teaching of this invention.

The invention is compatible with many possible configurations of the gas turbine as are found in the prior art. The gas turbine may include multiple expander stages, multiple spools, and multiple compressor stages with or without intercooling. If two spools are used, the compressor and a high-pressure expander may share a common spool and a lower-pressure expander drives the generator. The output shaft may be at hot end or the cold end of the machine. The speed reducer may be eliminated and generator driven directly. The generator may be a synchronous or induction machine. If the generator runs at higher than 3600 rpm (3000 rpm for 50 Hz), it may be necessary to insert an inverter between the generator and the switch gear. Though not preferred, the regenerator may be eliminated in some cases, especially in larger machines.

Components of the supercharger can be changed or eliminated. For example, for low levels of supercharging, the post-expander may be eliminated. The electromechanical transducer is the operated as a motor to drive the pre-compressor. The preferred pre-compressor for smaller applications is a TIVM machine.

It is possible to eliminate the electromechanical transducer. The design pressure ratios across the pre-compressor and the post-expander are adjusted so that the compression work matches the expander work. This may result in air entering the gas turbine at a higher pressure than that of gas leaving the gas turbine, which increases the output of the generator 26. Start up may be accomplished by modulating the bypass dampers 122 and 125 once the gas turbine is running.

Another alternative for eliminating the electromechanical transducers 108 and 208 is to drive the pre-compressors and post-expanders from a shaft extension from the generator 26. A clutch would be used to selectively engage or disengage operation of the pre-compressor and post-expander. A speed reducer or increaser may also be required.

Additional variations on the design of the pre-compressor and post-expander are also possible. For example, each pre-compressor may include multiple stages of compression, preferably with intercooling. Likewise multiple stages of expansion are also possible in each post-expander.

The coolers 106 and 206 are preferably heat exchangers that supply useful thermal energy to a building, water heating, industrial process, etc. Alternatively for installations where thermal energy is not used, the cooler is preferably a direct or indirect evaporative cooler or fogger that cools through the evaporation of water. An air-cooled or refrigerant-cooled cooler is also an option and may be preferred in some cases where water is not available.

While generally not preferred, the coolers may be eliminated. This option will reduce power output from the gas turbine, but can improve heating efficiency of the system and may be preferred in some cases.

While generally not preferred, it is possible to combine features of the supercharger into the gas turbine. For example, the post-expander can be housed within the gas-turbine. It can operate on the same shaft as the expander of the gas turbine and use a similar design to the gas-turbine expander. Likewise the pre-compressor can operate as another compressor stage and share a common shaft with the gas turbine compressor.

Air filtration can also be included in these systems. There are several possible options for the location of air filters. One location is just upstream of the cooler 106. Another is in air stream 114 or 215. Filtration is optional but normally preferred. Its design depends on the characteristics of the ambient air, the gas turbine and supercharging system and other factors.

Principle of Operation

A basic idea of the invention is to greatly increase the capacity of a gas turbine without significantly changing its aerodynamics. The invention accomplishes this by increasing the operating pressure at the inlet to the gas turbine. To achieve a large increase in output without exceeding the design pressure ratio of the expander, the turbine also increases pressure of gas leaving the expander section of the gas turbine. The result is the gas turbine sees conditions that are similar to those associated with increasing barometric pressure.

For example consider a system with a pressure ratio of 2.0 across the pre-compressor and the post-expander. The gas turbine operates as if the barometric pressure is two atmospheres. Since turbine capacity is directly proportional to barometric pressure, the output of the gas turbine is effectively doubled. The turbine performance is as if it were located at the bottom of a deep mine shaft even though its actual location is above sea level.

The operating pressure also increases capacity of the regenerator. Reynolds number is directly proportional to fluid density. Since gas density is proportional to pressure, doubling the pressure also doubles the Reynolds number. For turbulent flow, the heat transfer coefficient increases by roughly 1.8 for doubling of Reynolds number. For flow that is not fully turbulent, the effect can be smaller, but it should still give a significant improvement heat transfer in most cases. The higher density should help to reduce the physical size of the regenerator. These factors allow use of the same regenerator as is found in the unsupercharged system without a large change in effectiveness.

The system can also improve efficiency. The benefit depends on the efficiency of the pre-compressor and post-expander, the temperature of gas leaving the regenerator, the pressure ratios of the pre-compressor and post-expander, and other factors. Consider the case of a 500° F. gas temperature entering the post-expander and 90% pre-compressor and post-expander efficiency. For this case the work output from the post-expander is significantly greater than the power input to the pre-compressor, which means that the supercharger can add several percentage points to the overall system efficiency. This feature is contrary to the teachings of the prior art, which show that the unsupercharged gas turbine is already operating at near the optimum pressure ratio.

The post-expander can also help to compensate for any reduction in regenerator effectiveness associated with the high supercharged mass flow. Lower regenerator effectiveness would give a higher gas temperature to the post-expander. This higher gas temperature increases the work available from the expander which helps to offset the effect of the change in regenerator performance. This is a synergistic effect, which helps the overall system efficiency.

A key new feature of the system is the ability to easily change the design capacity of the gas-turbine system. It is possible to produce a whole family of turbines based on a single unsupercharged gas turbine design. For example, starting with a 250 kW unsupercharged gas turbine, it would be possible to add a 500 kW and a 1000 kW model. The supercharging pressure ratio for the 500 kW machine would be about 2; the 1000 kW machine would have a supercharger pressure ratio of about 4. The aerodynamics and physical size of the gas turbine including the regenerator could stay essentially the same with the main changes in the supercharger.

There are several options for starting the system. One approach is to start the gas turbine first in unsupercharged mode with the bypass dampers open. Once the gas turbine is through its start-up sequence, the electromechanical transducer is operated as a motor to drive the pre-compressor and the post-expander. The bypass dampers are then gradually closed to increase the inlet and outlet pressure for the gas turbine. The bypass dampers would close completely for normal operation after start up. This setup has the advantage that the new output power of the system is always positive after the initial start of the gas turbine.

Another possibility is to start the pre-compressor and post-expander first using the electromechanical transducer as a motor, preferably at a reduced speed. This causes a large flow of gas through the gas turbine, which causes the gas turbine to turn ("free-wheel"). The combustor is then lit and the turbine speed and the speed is increased as is the speed of the pre-compressor and post-expander. Other starting setups are certainly possible and may be desirable depending on the exact design constraints of the system.

Advantages

There are several important advantages of this system.
1. Large increase in capacity,
2. Improved efficiency possible,
3. Ability to use low-temperature materials in the post-expander,
4. Lower system cost on a $/kW output basis,
5. Ability to create a family of different turbines with different capacity ratings by changing the supercharging pressure to a base machine,
6. Improved heat transfer in the regenerator,
7. Ability to provide steps of capacity control using variation in supercharging pressure, and
8. Compact size per unit of output.

While this invention has been particularly shown and described with references to preferred embodiments thereof, it will be understood by those skilled in the art that various changes in form and details may be made therein without departing from the scope of the invention encompassed by the appended claims.

What is claimed is:

1. A regenerated gas-turbine system comprising:
    a) A gas turbine that comprises a compressor, a combustor, a first expander, and a regenerator wherein said compressor supplies pressurized air to said regenerator which warms the air which then flow through said combustor which burns fuel to heat the air stream to form a hot gas stream that expands through said first expander;
    b) A second expander located downstream from said regenerator; and
    c) A pre-compressor and a cooler located upstream of the inlet to said compressor of said gas turbine which pressurize and cools the air entering said compressor, wherein said pre-compressor comprises a toroidal intersecting vane machine.

2. A supercharged gas turbine system comprising:
    a) A gas turbine that comprises a compressor, a combustor, and a first expander wherein said compressor supplies pressurized air said combustor which burns fuel to heat the air stream to form a hot gas stream that expands through said first expander; and
    b) A positive-displacement pre-compressor located upstream of said compressor which increases the pressure of air entering said compressor in said gas turbine wherein said positive-displacement pre-compressor comprises a toroidal intersecting vane machine.

3. The supercharged gas turbine of claim 2 further comprising a cooler located in the air stream between said pre-compressor and said compressor.

4. A supercharged gas turbine system comprising:
    a) A gas turbine that comprises a compressor, a combustor, a first expander, and a regenerator wherein said compressor supplies pressurized air to said regenerator which warms the air which then flow through said combustor which burns fuel to heat the air stream to form a hot gas stream that expands through said first expander;
    b) A positive-displacement pre-compressor that supplies pressurized air to said compressor; and
    c) A second expander located downstream from said regenerator.

5. The supercharged gas turbine system of any of claim 1, 2 and 3 wherein the toroidal intersecting vane machine comprises a supporting structure having an inside surface, a first rotor and at least one intersecting second rotor rotatably mounted in said supporting structure, wherein:
    (a) said first rotor has a plurality of first vanes positioned on a radially inner peripheral surface of said first rotor, with spaces between said first vanes and said surface defining a plurality of primary chambers;
    (b) an intake port which permits flow of a fluid into said primary chamber and an exhaust port which permits exhaust of the fluid out of said primary chamber;
    (c) said second rotor has a plurality of secondary vanes positioned on a radially outer peripheral surface of said second rotor, with spaces between said secondary vanes and said surface defining a plurality of secondary chambers;
    (d) a first axis of rotation of said first rotor and a second axis of rotation of said second rotor arranged so that said axes of rotation do not intersect, said first rotor, said second rotor, first vanes and secondary vanes being arranged so that said first vanes and said secondary vanes intersect at only one location during their rotation; and
    (e) wherein the secondary vanes positively displace the primary chambers and pressurize the fluid in the primary chambers and fluid in the secondary chambers is not substantially pressurized.

6. The supercharged gas turbine system of any of claim 1, 2 and 3 wherein the toroidal intersecting vane machine comprises a supporting structure having an inside surface, first and second intermeshing rotors rotatably mounted in said supporting structure,
    (a) said first rotor having a plurality of first vanes positioned in spaced relationship on a radially inner peripheral surface of said first rotor with said radially inner peripheral surface of said first rotor and a radially inner peripheral surface of each of said first vanes being transversely concave, with spaces between said first vanes and said inside surface defining a plurality of primary chambers,
    (b) said second rotor having a plurality of second vanes positioned in spaced relationship on a radially outer peripheral surface of said second rotor with said radially outer peripheral surface of said second rotor and a radially outer peripheral surface of each of said second vanes being transversely convex, with spaces between said second vanes and said inside surface defining a plurality of secondary chambers, (c) with a first axis of rotation of said first rotor and a second axis of rotation of said second rotor arranged so that said axes of rotation do not intersect, and (d) wherein said first vanes and said second vanes being arranged so that said first vanes and said second vanes intermesh at only one location during their rotation.

* * * * *